United States Patent [19]

Ikeda et al.

[11] Patent Number: 4,639,070

[45] Date of Patent: Jan. 27, 1987

[54] BEAM SCANNING TYPE INFORMATION READOUT DEVICE

[75] Inventors: Hiroyuki Ikeda, Yokohama; Seikichi Matsumoto, Sano; Shunji Kitagawa, Kawasaki; Takefumi Inagaki, Kawasaki; Ichiro Sebata, Kawasaki, all of Japan

[73] Assignee: Fujitsu Limited, Kawasaki, Japan

[21] Appl. No.: 223,764

[22] Filed: Jan. 9, 1981

[51] Int. Cl.$^4$ .............................................. G02B 26/12
[52] U.S. Cl. ...................................... 350/3.71; 235/462
[58] Field of Search ..................... 350/3.71, 6.1–6.4; 235/457, 472, 462

[56] References Cited

U.S. PATENT DOCUMENTS

| | | | |
|---|---|---|---|
| 3,253,498 | 5/1966 | Lindberg et al. | 350/6.4 |
| 3,614,448 | 10/1971 | DiProx et al. | 350/6.4 |
| 3,972,582 | 8/1976 | Oosaka et al. | 350/3.71 |
| 4,113,343 | 9/1978 | Pole et al. | 350/3.71 |
| 4,224,509 | 9/1980 | Cheng | 235/457 |
| 4,251,798 | 2/1981 | Swartz et al. | 235/462 |

OTHER PUBLICATIONS

Bryngdahl and Lee, *Laser Beam Scanning Using Computer-Generated Holograms*, Applied Optics, vol. 15, No. 1, Jan. 1976, pp. 183 to 194.

Sullivan, *Alignment of Rotational Prisms*, Applied Optics, vol. 11, No. 9, Sep. 1972, pp. 2028 to 2032.

Cindrich, *Image Scanning by Rotation of a Hologram*, Applied Optics, vol. 6, No. 9, Sep. 1967, pp. 1531 to 1534.

*Primary Examiner*—Bruce Y. Arnold
*Attorney, Agent, or Firm*—Staas & Halsey

[57] ABSTRACT

A beam scanning-type information readout device, and more particularly, a hand-carried beam scanning-type information readout device which can read information consisting of a bar-code-symbol applied to a product and which is low in cost, simply operated and very useful and has high readout accuracy. The beam scan type information readout device comprises a laser beam generator, an optical beam scanner which deflects and scans plural beams generated from the laser beam generator or deflects and scans a beam generated from the laser beam generator in plural directions, an optical beam detector which detects the beam reflected from the bar-code-symbol, and a case which functionally and physically accommodates the above-identified elements and also provides a grip portion for the operator.

3 Claims, 28 Drawing Figures

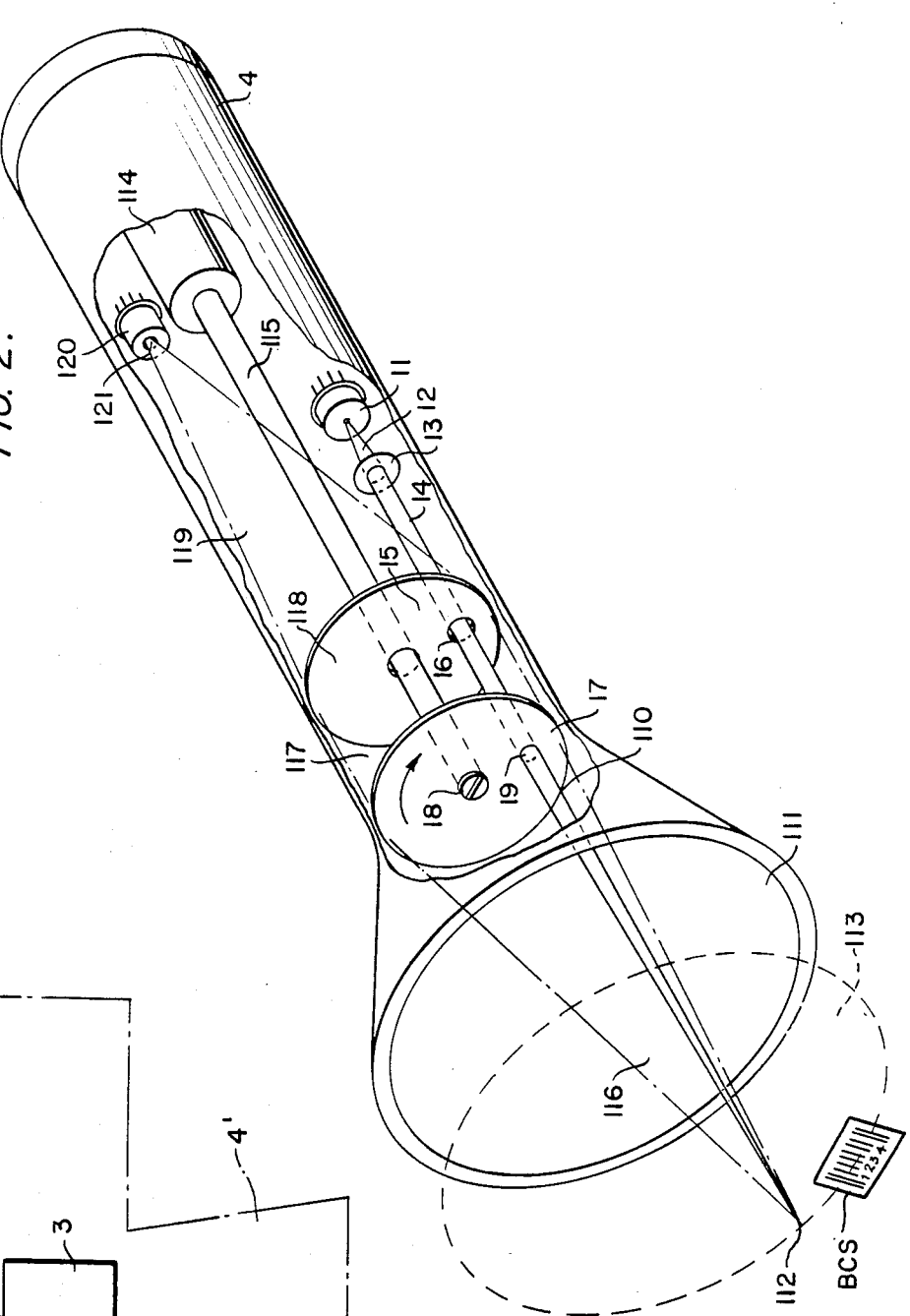
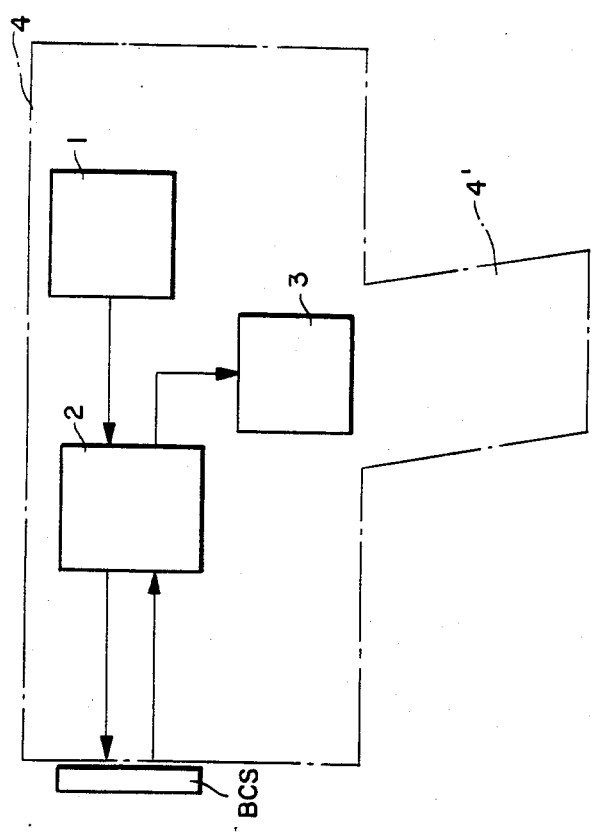
FIG. 1.
FIG. 2.

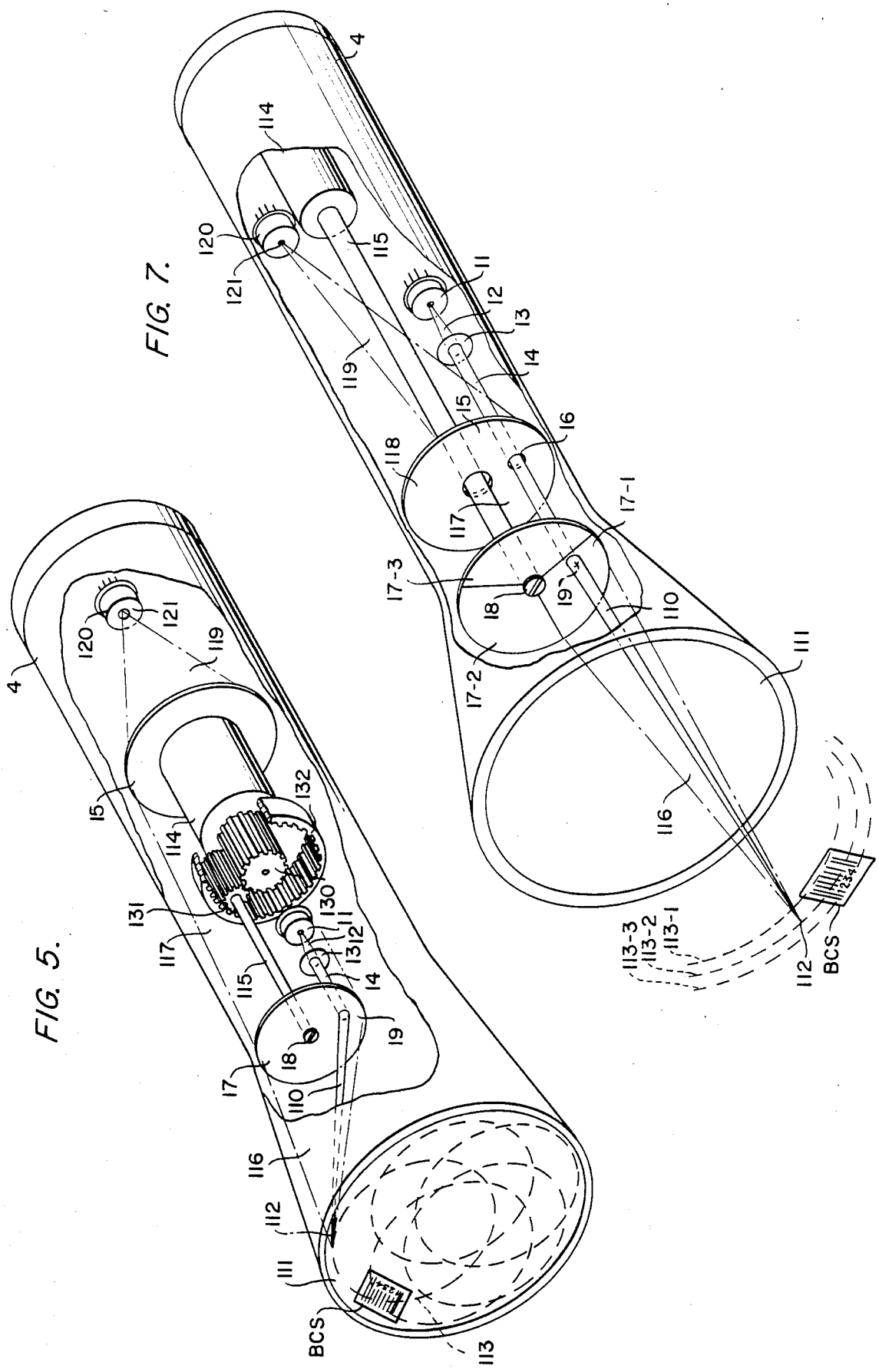

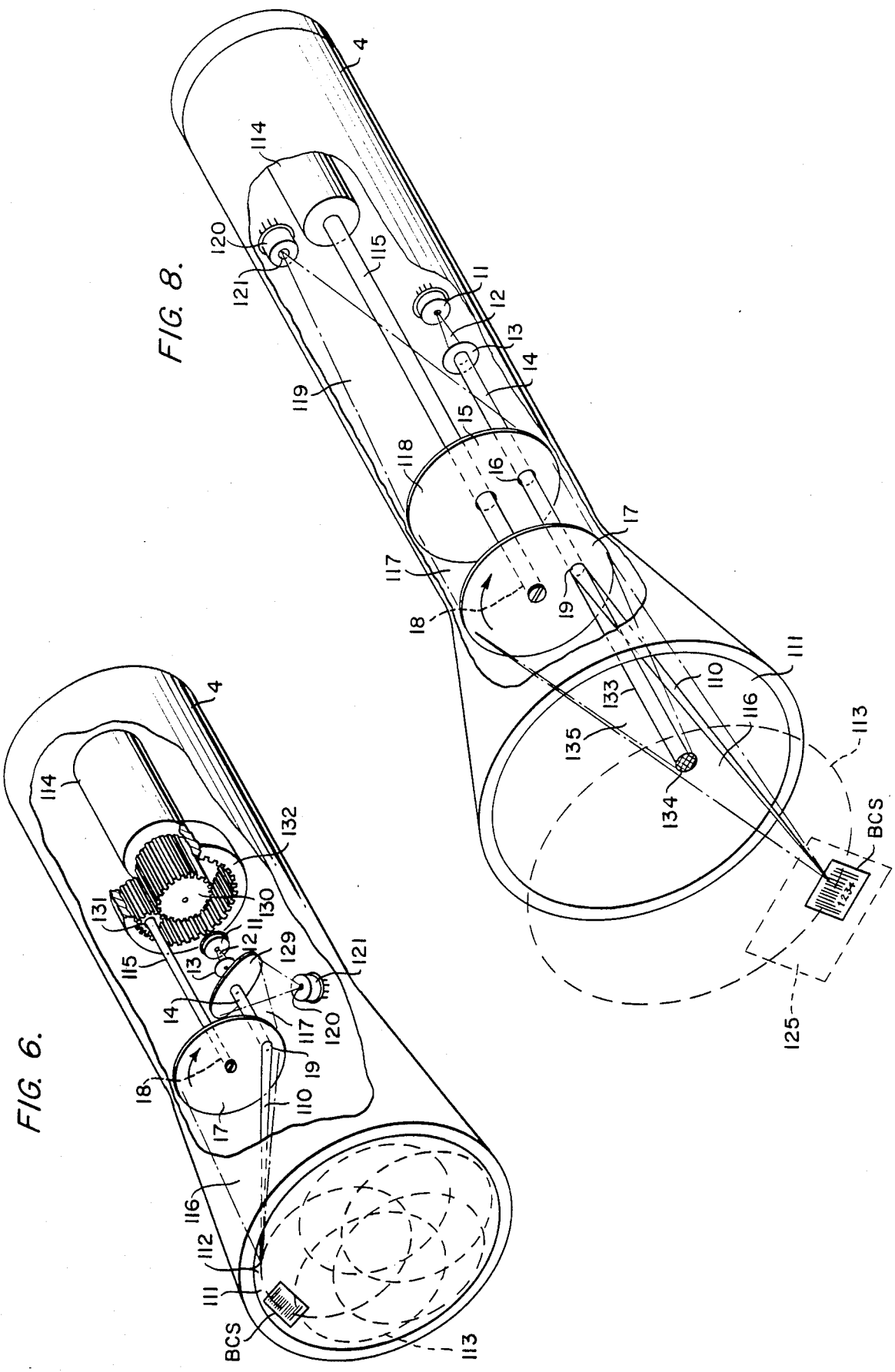

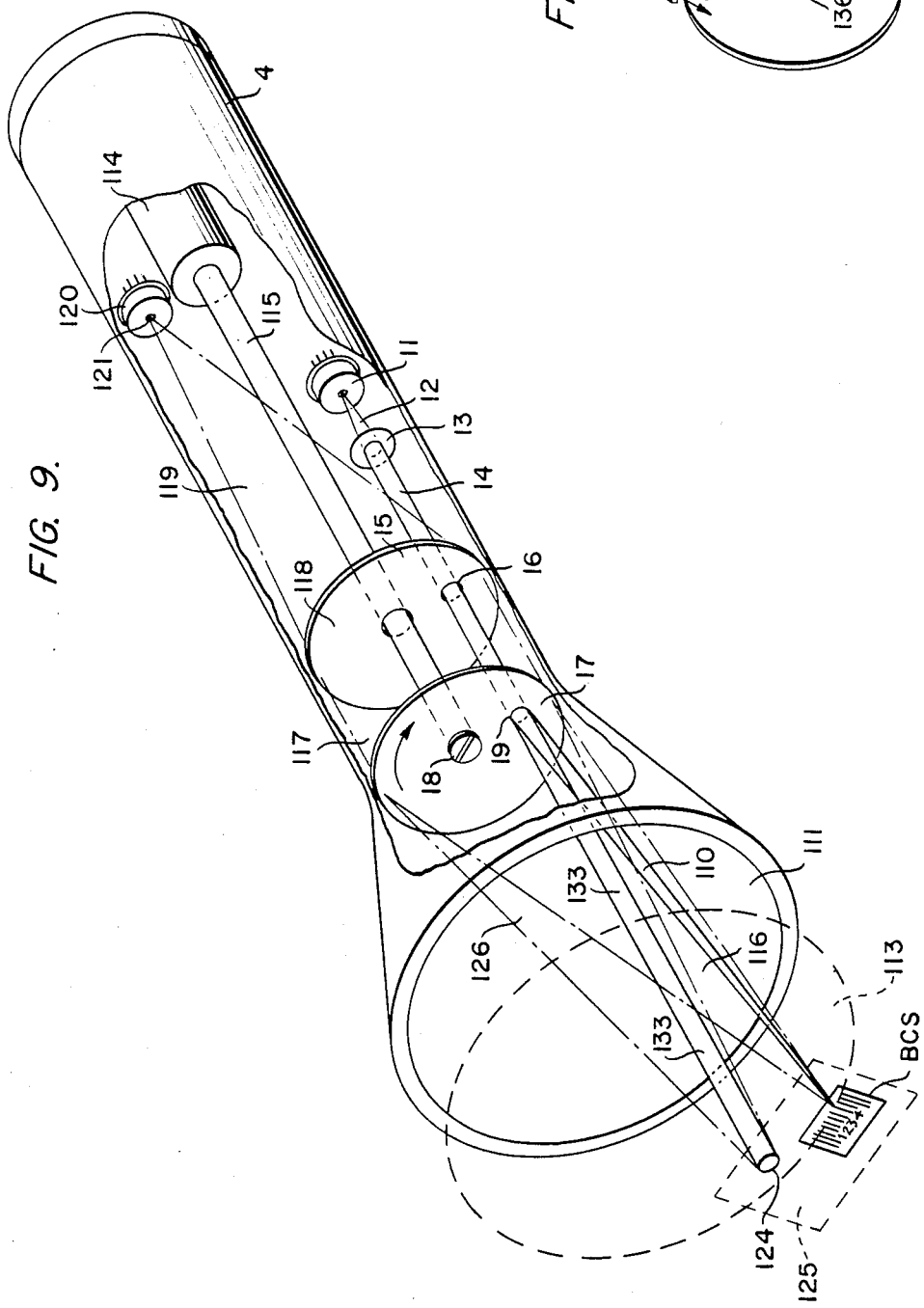

BEAM SCANNING TYPE INFORMATION READOUT DEVICE

BACKGROUND OF THE INVENTION (1) Field of the Invention

The present invention relates to a beam scanning type information readout device, particularly to a beam scanning type information readout device which can read omnidirectionally the information for a product expressed in bar-code-format by means of a beam scanner which can be carried in the hand.

(2) Description of the Prior Art

The existing bar-code-information readout devices can be roughly classified into the light-pen type and stationary scanner type. The former results in a disadvantage of reduced information readout efficiency in that the scanning speed fluctuates and the point floats because an operator moves the pen on the bar-code-symbol. Moreover, the latter also results in disadvantages in that the structure is complicated and the physical dimensions are large due to the stationary nature, thus, a more costly device, and, additionally, an operator has less freedom in operation due to the stationary nature. On the other hand, an information readout device, which can be carried easily and has improved information readout efficiency by focusing on the above-mentioned points, has become known. This is generally called a hand scanner. This device by itself is lightweight, capable of processing the bar-code-information for the products, and has a high information reading ratio through high speed laser beam scanning. Details of such a device are described, for example, in Japanese Laid Open Patent Publication No. 52-148146 and 53-66330.

However, the hand scanner device, described above, uses a mirror which generates vibrations in the laser beam scanning system and, therefore, results in disadvantages in that the structure is complicated, mechanical vibration and noise are considerably high, energy efficiency is bad, and high speed scanning is restricted because the size of the mirror is limited based on inertia. In addition, such a device has the disadvantage that there is no possibility of omnidirectional reading between the readout information area (hereinafter called the bar-code-symbol for simplification) and the device. This is because only one scanning line is used and scanning is made only in a single direction and an operator always has to be concerned about direction matching.

SUMMARY OF THE INVENTION

It is an object of the present invention to provide an information readout device having a simple structure and being low in cost, which are advantages of a lightpen, along with excellent readout efficiency and operationability, which are advantages of the stationary-type information reading device.

It is also an object of the present invention to provide an information readout device which is simple in structure, results in the least mechanical vibration to eliminate the mechanical noise problem, and has a long operational life with minimum maintenance.

The present invention has solved the above-mentioned problems of existing information readout devices by providing a device comprising an optical generator, an optical scanner which deflects and scans an optical beam to plural areas and/or in plural directions, an optical detector which detects an optical beam reflected from the bar-code-symbol and a case which accommodates the above elements and forms a grip portion The readout device is compact because laser beam projection and receiving devices are adjacent to and aligned with the rotation axis of a rotating disk hologram. The rotating hologram scans the laser beam from a laser beam source adjacent to the rotation axis over a bar code and refocuses the beam scattered by the bar code. A convergent lens converges the refocused beam onto the optical detector which is also adjacent to the rotational axis.

The invention thereby achieves a low cost information readout device with a simple structure. In addition, the present invention achieves a very compact optical scanning type information readout device which assures as high an information readout efficiency as the existing stationary type information readout device even with a simple low cost structure.

BRIEF DESCRIPTION OF THE DRAWINGS

FIG. 1 shows an outline and block diagram of an information readout device according to the present invention;

FIG. 2 shows an embodiment of an information readout device of the present invention;

FIGS. 5-9 show other embodiments of an information readout device according to the present invention;

FIG. 10 shows another embodiment of the light absorption structure shown in FIG. 8;

DETAILED DESCRIPTION OF THE EMBODIMENTS

Figure 3:
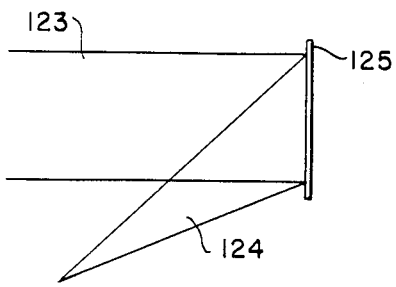
FIG. 3 explains the method of generating a hologram to be adapted to the embodiment of FIG. 2.

FIG. 1 shows the basic concept for an information read-out device according to the present invention. In this figure, reference numeral 1 designates an optical generator consisting of a laser generator; 2 is an optical scanner; 3 is an optical detector; 4 is a case; and 4' is a grip portion of the case. In addition, the abbreviation BCS designates a bar-code-symbol applied to products, etc. In the case of the information readout device of the present invention, the optical generator 1, the optical scanner 2 and the optical detector 3 are functionally and physically accommodated in the case 4 whereby an operator can easily carry the device in his hand by holding it at the grip portion 4'. An operator is thus capable of obtaining a contact between the optical projection window of the information readout device and the bar-code-symbol BCS of a product in open space by carrying them individually. For example, the operator can hold the relevant information readout device with the right hand while he holds a product in the left hand. As a result, working efficiency for information readout can be improved drastically.

The optical scanner 2 used in the present invention deflects and scans a beam generated from the laser generator 1 at least to two different areas or at least in two different directions for the bar-code-symbol BCS to be read by means of a hologram or optical lens, etc. Because of this, the information readout efficiency is significantly improved compared to existing readout devices where only one scanning laser beam is scanned in only one direction. Moreover, proper operation of the device is simplified because the information can be read correctly only by bringing the beam projecting window of the device to the area where the bar-code-symbol BCS is attached, without the operator having to be conscious of the orientation in arrangement of the bar-code-symbol BCS.

A structural example of the optical scanner 2 will be explained later, but it should be noted for any embodiment that the optical scanning system for deflecting and scanning the beam in at least to two different areas or in two different directions is simplified and reduced in size.

A number of embodiments utilizing the coherent laser generator as the optical generator will now be explained.

Figure 13:
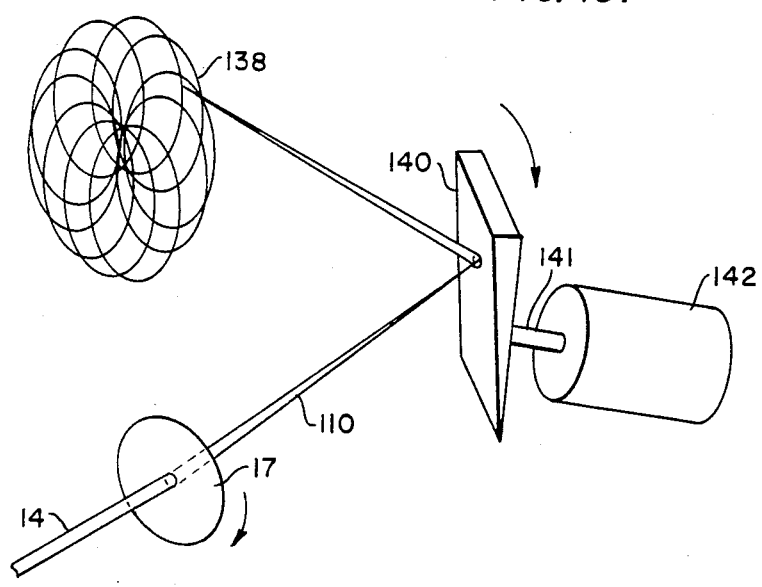

FIG. 2 shows one embodiment of the information readout device of the present invention. In FIG. 2, reference numeral 11 represents the coherent laser generator using a semiconductor laser, gas laser device or the end surface of a light guide for transmitting the coherent beam from outside the device. A beam 12 emitted from the coherent laser generator 11 is converted to a plane wave 14 by a lens system 13 and vertically enters an area 19 deviated from a rotation center 18 of a hologram 17 passing through a hole 16 of a fixed Fresnel lens 15. As shown in FIG. 13, the hologram 17 is obtained through interference between a coherent plane wave 123 and a spherical wave 124 on a sensitive material 125. A first order diffracted beam 110 of the beam having entered the hologram 17 is focused to a point 112 through a transparent readout window 111. The hologram 17 is attached to a shaft 115 which is directly connected to a motor 114 and rotates in the direction indicated by the arrow mark. As a result, the focusing point 112 of the first order diffracted beam 110 of the hologram 17 scans on a circular locus 113 indicated by the dotted line in the figure.

When there is a bar-code-symbol BCS on the circular locus 113, a reflected scattering beam 116 passes through the transparent readout window 111 and hologram 17 and is converted to a wave 117. Wave 117 is almost parallel to the rotating axis 115 of the hologram 17 and enters the Fresnel lens 15. A focal point 118 of Fresnel lens 15 is previously fixed in an area a little apart from the rotating axis 115 of the hologram. A wave 119 converged by this Fresnel lens 15 is focused onto an effective detecting surface 121 of an optical detector 120 positioned apart from the rotating axis 115 and whereby the bar-code-symbol BCS information is converted to electrical amplitude information which changes in relationship to time.

The above optical and electrical parts are physically and functionally accommodated in the case 4 as shown in FIG. 2 with such a shape and weight that the device can be carried in the operator's hand. Such a structure can be obtained in the same way even when a different optical lens is used in place of the Fresnel lens 15. For the hologram 17, there may also be used diffraction grating by means of mechanical ruling or a computer hologram (i.e., one depicted by calculating distribution of the interference fringe using a computer, not by the interference of the coherent laser beam). Moreover, a semiconductor element, photomal or optical fiber may also be used as the optical detector 120 and thereby the beam may be guided to an optial detector provided outside of the device.

According to the above embodiment of the present invention, a portable information readout device is achieved which can be carried in an operator's hand and which has a simple structure.

Figure 4:
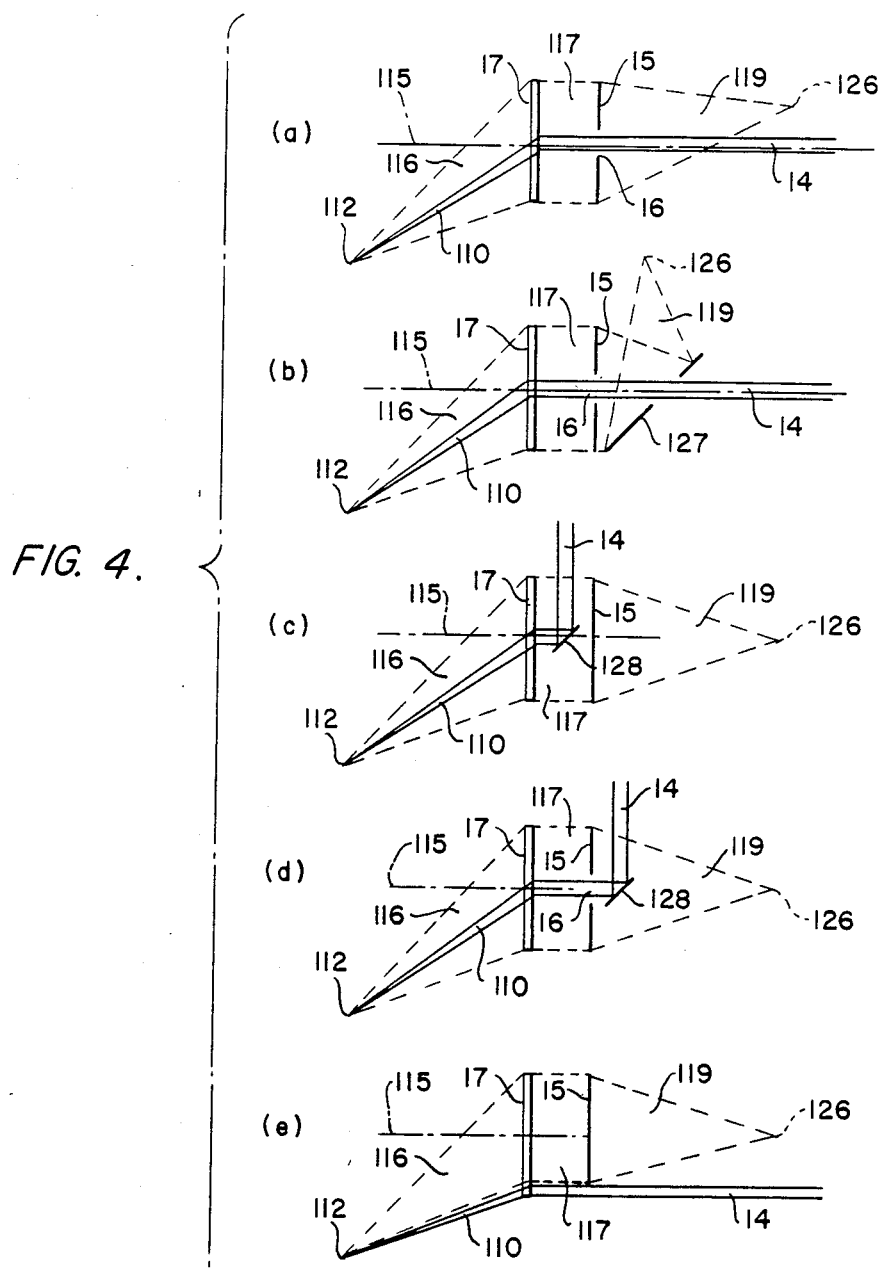
FIG. 4 shows a modification of the optical system in the embodiment of FIG. 2.

FIG. 4 shows another modification in the optical system for the embodiment of FIG. 2. In each part (a)–(e) of FIG. 4, reference numeral 14 is the coherent plane laser beam wave for reproducing the hologram; 15 is the Fresnel lens; 16 is the hole at the center of the Fresnel lens; 17 is the hologram; 110 is the first order diffracted beam from the hologram; 112 is the laser beam focusing point; 115 is the rotating axis of the hologram; 116 is the signal beam reflected and scattered from the BCS; 117 is the wave rediffracted by the hologram among the signal beam; 119 is the signal beam focused by the lens 15, and 126 is an image reforming point of the signal beam 116. The optical system shown in FIG. 4(a) is different from the system in the embodiment of FIG. 2 in that the laser beam 14 enters the rotation center of hologram 17. This has an advantage in that the hologram does not result in fluctuations due to abberation because the same portion is always used. FIG. 4(b) has a structure with a mirror 127 having a pin-hole, through which the laser beam 14 for reproduction of the hologram passes, provided between the lens 15 and the image reforming point 126, and the center (optical axis) of the lens 15 matches the rotating axis 115 of the hologram. Therefore, the degrees of freedom in designing increase since the Fresnel lens 15 may be fixed or may be rotating together with the hologram 17. On the other hand, since the center of the reformed image (due to the increase of readout depth) does not change, the laser beam intensity also changes very little on the light detector. FIGS. 4(c), (d) and (e) are other structural examples of the optical system having the same advantage as that shown in FIG. 4(b). The hologram may be changed with the Fresnel lens at the laser beam focusing portion. In addition, a mirror 128 may be used to redirect the laser beam 14 for reproduction of the hologram.

Figure 16:
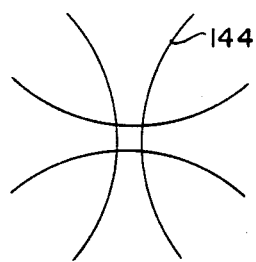

FIG. 5 and FIG. 6 depict modifications of the embodiment of the device shown in FIG. 2. In FIGS. 5 and 6, the hologram 17 is directly coupled to a gear 131 and thereby the rotation axis 115 is rotated by means of a gear 130 directly connected between the gear 131, the motor 114 and an external gear 132. Since the center of the circular scanning pattern 113 moves sequentially (as indicated by the broken line in the figures), the above structure has an advantage in that restriction for the bar-code-symbol BCS setting position is alleviated compared with that when only one circular scanning pattern is used (as in the embodiment shown in FIG. 2). The structure of FIG. 16 is different from FIG. 5 in that the laser beam 117, which has been focused by the hologram 17, reflected and converted again to the parallel beam flux by the hologram 17, is focused on the optical detector 120 by a reflective optical system having a beam focusing effect, for example, by a concave mirror 129. The structure of this embodiment has the effect of raising the laser beam gathering efficiency.

The device deptided in FIG. 7 is a modification of the embodiment of FIG. 2. The difference in this modification from FIG. 2 is found in the hologram. For example, as indicated in the figure, the hologram disk is divided into three sections 17-1, 17-2 and 17-3. The hologram is formed in such a way as to generate arcs of which scanning locations deviate little by little, as indicated in FIG. 7 by the broken lines 113-1, 113-2 and 113-3. The scanning lines formed by a hologram divided into three positions can naturally draw the same locus. In this case, the repetition period of a scanning line becomes ⅓ of that when the number of revolutions of the hologram is constant. Accordingly, the readout rate can be improved. The number of divisions of the hologram can be selected freely from 2 or more.

FIG. 8 shows another embodiment of the invention effective for stabilization of S/N (signal-to-noise ratio) of the readout signal. In the figure, the hologram 17 is a kind of diffraction grating and a non-diffracted beam (zero order beam) 133 is also generated in addition to the information readout beam 110. This beam is basically absorbed by beam absorbing material 134 fixed to the readout window 111 and does not reach the surface of a product, designated by reference numeral 125. Only a slight reflected stray beam 135 may occur.

FIG. 9 shows the structure of an embodiment where the beam absorbing material employed in the embodiment of FIG. 8 is not used. Namely, the zero order beam 133, emitted from the hologram, passes the readout window 111 and is reflected by the surface on the product 125 other than the bar-code-symbol BCS. The noisy beam, in some cases, is a stray beam 126 reflected from the product which reaches the optical detector 120 via the hologram 17 and the Fresnel lens 15. In this case, low frequency bias noise is introduced into the signal beam 116, thus deteriorating the signal accuracy. Therefore, the embodiment of the information readout device of FIG. 8 providing the beam absorbing material which basically eliminates the zero order beam is particularly suitable for the readout of data on the products having a reflective glossy surface.

FIG. 10 shows another beam absorbing structure for an embodiment of the device. A reflection mirror 136 is provided at the readout window 111 for reflecting the beam 133 and the beam absorbing material 134 is provided within the path of the beam reflected from mirror 136. In such a case, only that portion of the beam which is scattered by the beam absorbing material 134 and reflected by mirror 136 advances toward the hologram and resultingly, the level of the noisy beam is significantly reduced.

Figure 11:
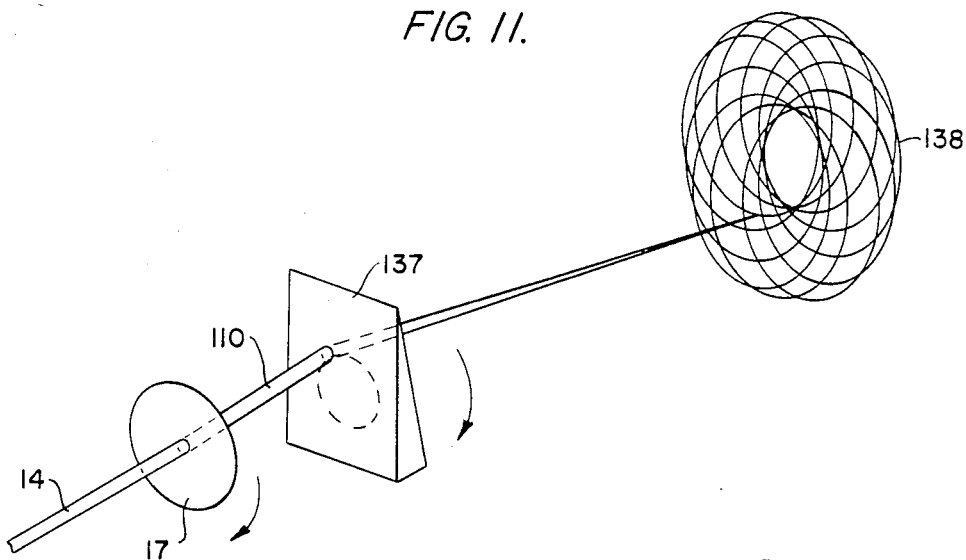
FIGS. 11-13 show other embodiments of the present invention.
Figure 12:
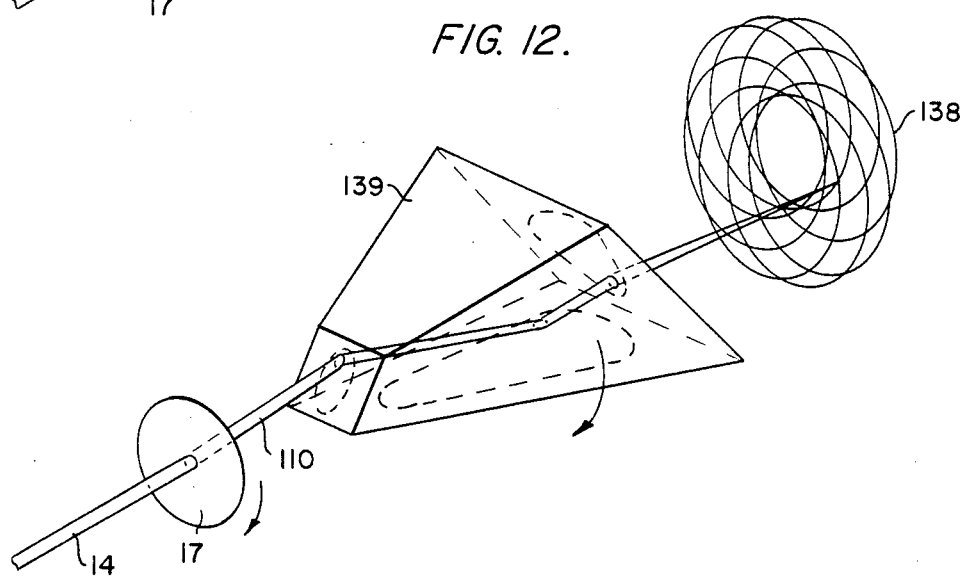

FIG. 11, FIG. 12 and FIG. 13 show respectively other embodiments of the device employing eccentric-type circular scanning pattern generating methods, such as previously discussed for the FIG. 5 and FIG. 6 embodiments. In the embodiments of FIGS. 11–13, the optical system which deflects the circular scanning pattern is provided between the hologram and the information readout area.

Namely, in FIG. 11, a rotating prism 137 is used and is rotated at a number of revolutions different from that of hologram 17. Thereby, the eccentric-type circular scanning pattern 138 is obtained. In FIG. 12, a rotating Dove prism 139 is used in place of the rotating prism 137. By deviating the incident beam axis of the Dove prism 139 from the outgoing beam axis, a similar eccentrictype circular scanning pattern 138 can be obtained. Moreover, in FIG. 13, a rotating mirror 140 is used in place of the rotating prism 137. The flat mirror 140 is mounted with a specified inclination angle with respect to a rotating axis 141 of a motor 142. This method has an advantage in that no aberration is generated in the scanning beam because only the reflection of the beam is used.

Figure 14:
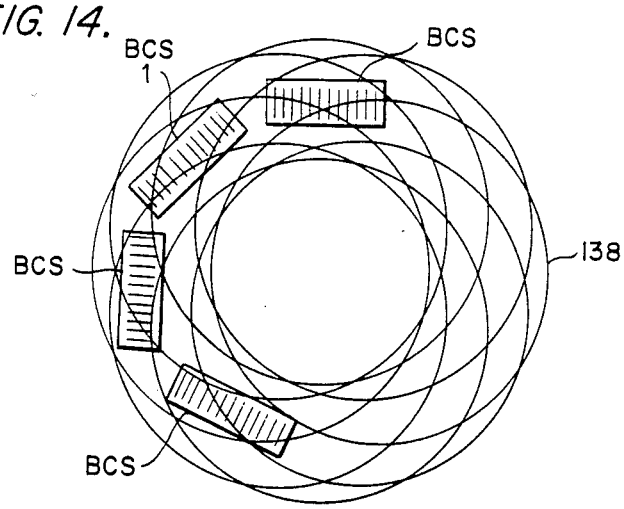
FIG. 14 explains the positional relation between the scanning pattern of the device and bar code symbols to be read.

FIG. 14 shows the positional relation between the eccentric-type circular scanning pattern 138 and the bar-code-symbol BCS. As will be understood from the figure, the bar-coee-symbol BCS can be oriented in any direction and there is no need to provide particular positioning between the readout device and the bar-code-symbol BCS by applying the eccentric-type circular scanning pattern. Therefore, this structure is excellent in readout operability.

Figure 15:
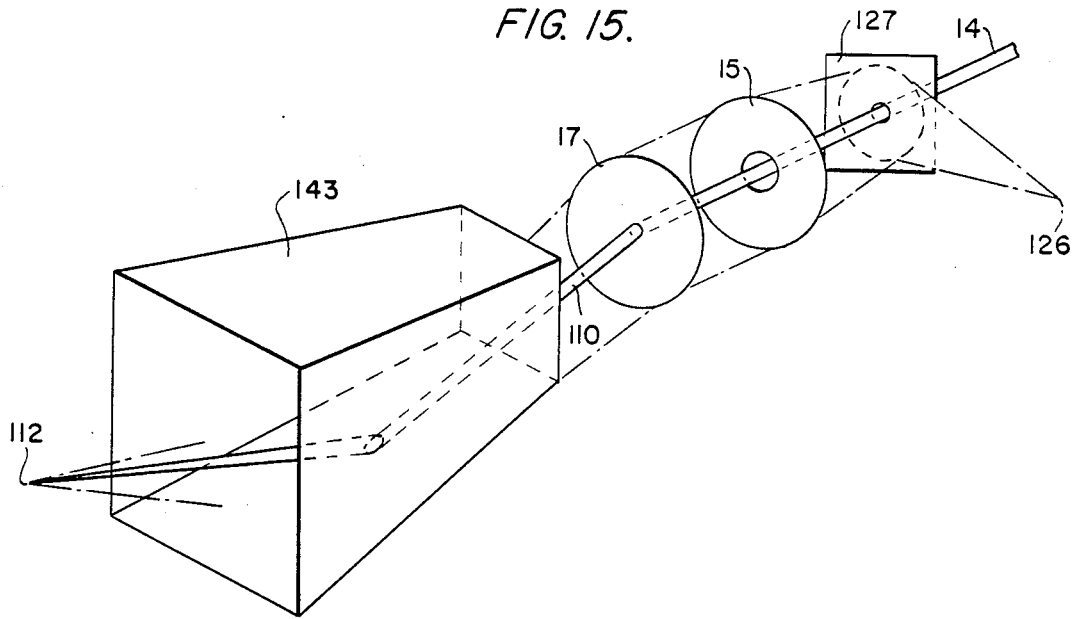
FIGS. 15-19 explain further embodiments of the present invention.
Figure 17:
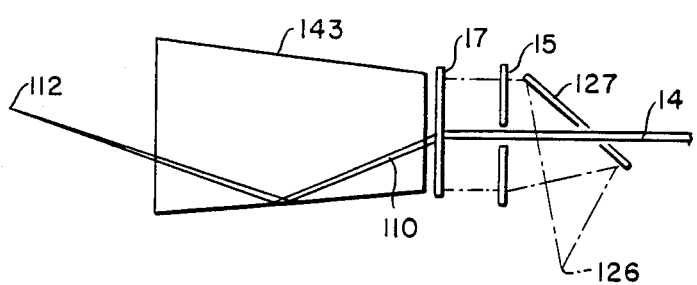

FIGS. 15–17 show respectively another embodiment of the present invention. FIG. 15 is a perspective view while FIG. 17 is a side view of the basic structure for this embodiment. This device utilizes a rotating mirror tunnel 143. The mirror tunnel 143 is provided between the information readout area and the hologram 17 and is rotated at a number of revolutions different from that of the hologram. When the hologram 17 rotates at the number of revolutions higher than the mirror tunnel 143, the cross scanning pattern 144 depicted in FIG. 16 can be obtained. This pattern also rotates as the mirror tunnel 143 rotates. In this case, the laser beam focusing point 112 scans the information readout in detail and thereby the truncated bar-code-symbol BCS can also be read in any direction by providing a deviation between the rotating axes of the hologram 17 and the mirror tunnel 143, or by giving different angles little by little to four surfaces of the mirror tunnel for the rotating axis, or by combining them.

Figure 18:
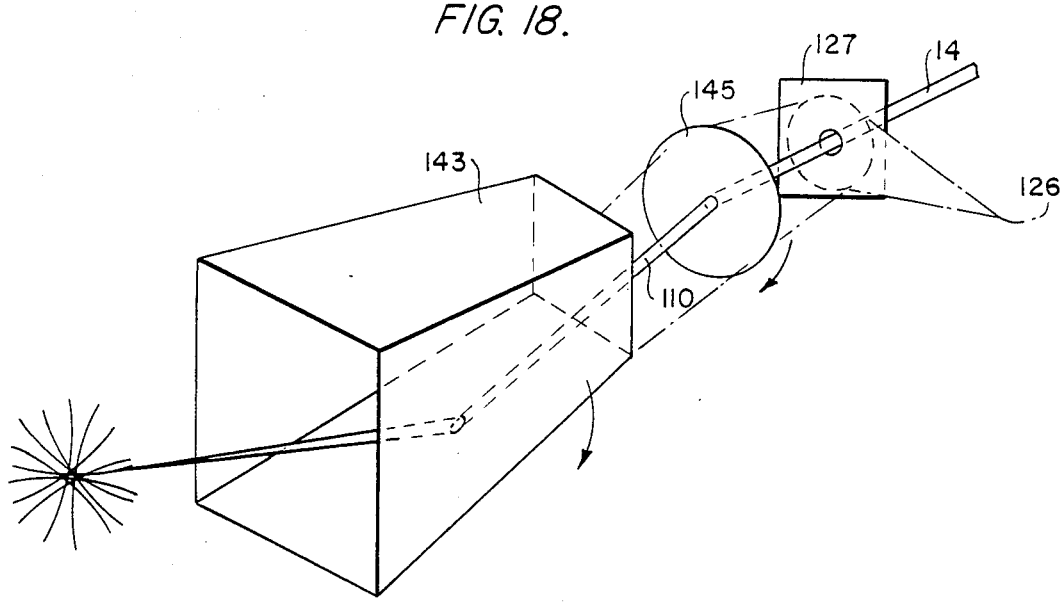

FIG. 18 shows another embodiment of the device employing a mirror tunnel. The only difference in this FIG. 18 embodiment from the embodiment of FIGS. 15 and 17 is that the hologram is composed of the self-focusing hologram 145. This device has an optical system greatly simplified because the laser beam coming via the hologram 145 is self-focused to the image reforming point 126 by means of the beam focusing nature of the hologram.

Figure 19:
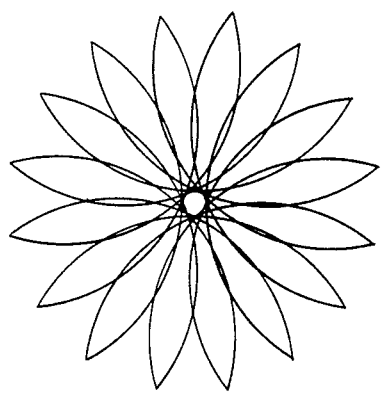

FIG. 19 shows an example of the scanning pattern obtained by the device employing a rotating mirror tunnel.

Figure 20:
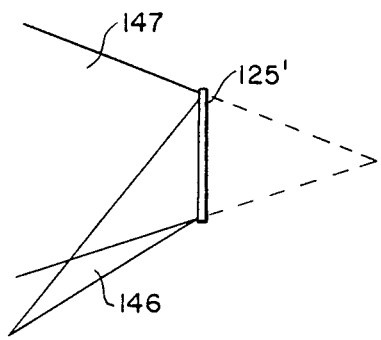
FIG. 20 explains the method of generating the hologram adapted to the embodiment indicated in FIG. 18.

FIG. 20 shows an example of the method of generating the self-focusing-type hologram 145 used in the embodiment of FIG. 18. The hologram can be obtained by interference between the divergent spherical wave 146 and convergent spherical wave 147 on the sensitive material 125' for the hologram.

Figures 21, 24, 25, 27:
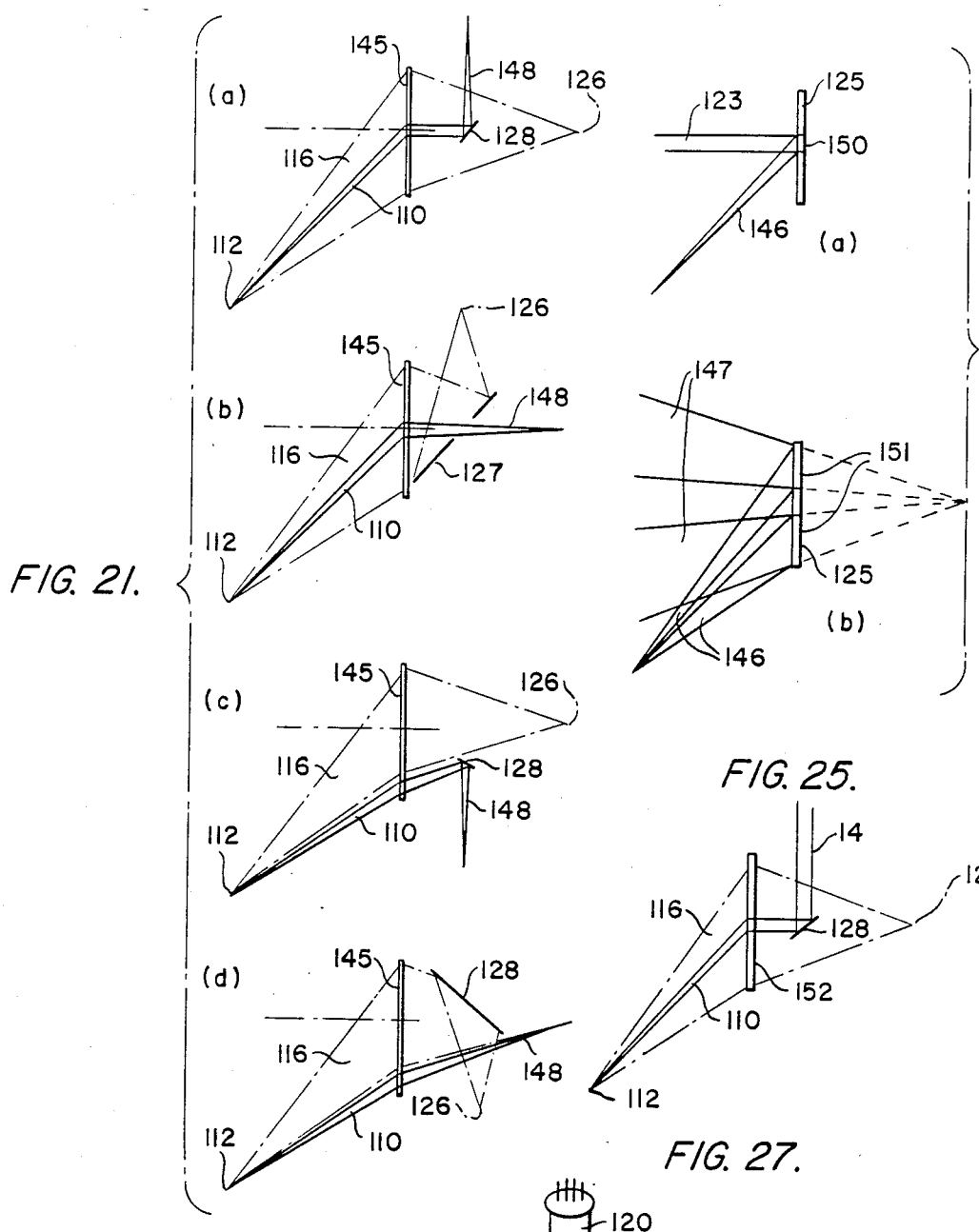
FIG. 21 shows another modification of the optical system shown in FIG. 18.
FIG. 24 explains another example of the method of generating the hologram to be used to the embodiment shown in FIG. 18.
FIG. 25 shows an application example of the hologram shown in FIG. 24.
FIG. 27 shows another embodiment of an information readout device of the present invention.

FIG. 21 shows the waves obtained by the hologram 145. The hologram is capable of obtaining the diffracted beam 110 by a spherical wave 148. The laser beam 116 reflected from the bar-code-symbol BCS placed in the vicinity of the convergent point 112 of the diffracted beam 110 is focused to the image reforming point 126 by the hologram 145.

Figure 22:
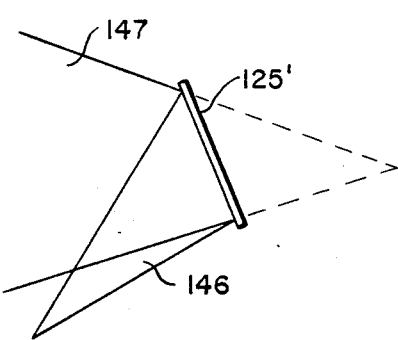
FIG. 22 explains another method of generating the hologram to be adapted to the embodiment shown in FIG. 18.
Figure 23:
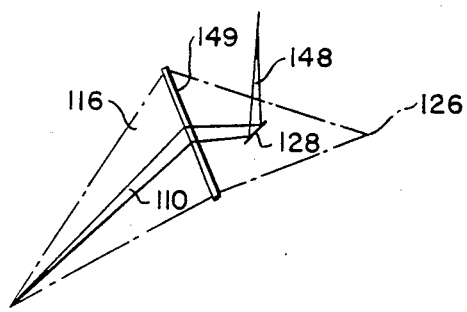
FIG. 23 shows an application example of the hologram shown in FIG. 22.

FIG. 22 shows another example of the method of generating the self-focusing hologram used in the embodiment of FIG. 18. In this embodiment, the hologram sensitive material 125' is arranged with some inclination to the beam axis of the convergent spherical wave 147. FIG. 23 illustrates an application of the hologram, generally designated by the reference numeral 149, generated in the method illustrated in FIG. 22. An advantage is achieved in that the interference fringe of the hologram is formed in the thickness direction of the hologram and is least influenced by the elongation and compression of the hologram material in the thickness direction.

FIG. 24 is another of the method of generating the self-focused-type hologram used in the embodiment of example FIG. 18. Namely, the same laser beam 146 is used for making a hologram area 150 for the scanning and a hologram area 151 for focusing and the reference beams 123 and 147 should have different waves. Naturally, when the laser beam 146 is the same, the combination of these reference beams can be selected freely.

FIG. 25 is an embodiment of the divided self-focusing-type hologram, generally designated by the reference numeral 152, generated in the method illustrated in FIG. 24.

Figure 26B:
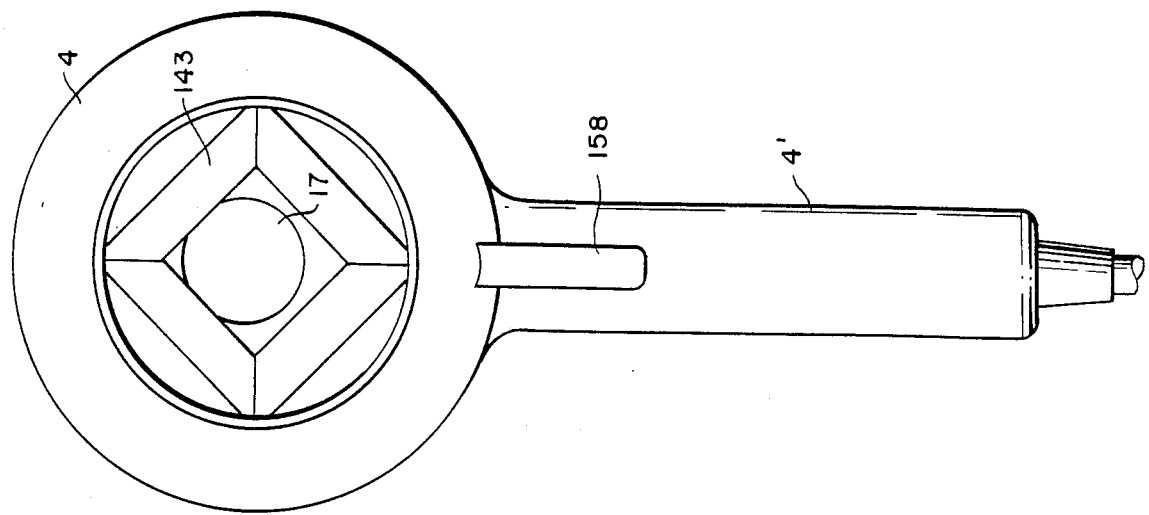
FIGS. 26A and 26B show a practical examples of a device using the embodiment of the invention shown in FIG. 15.
Figure 26A:
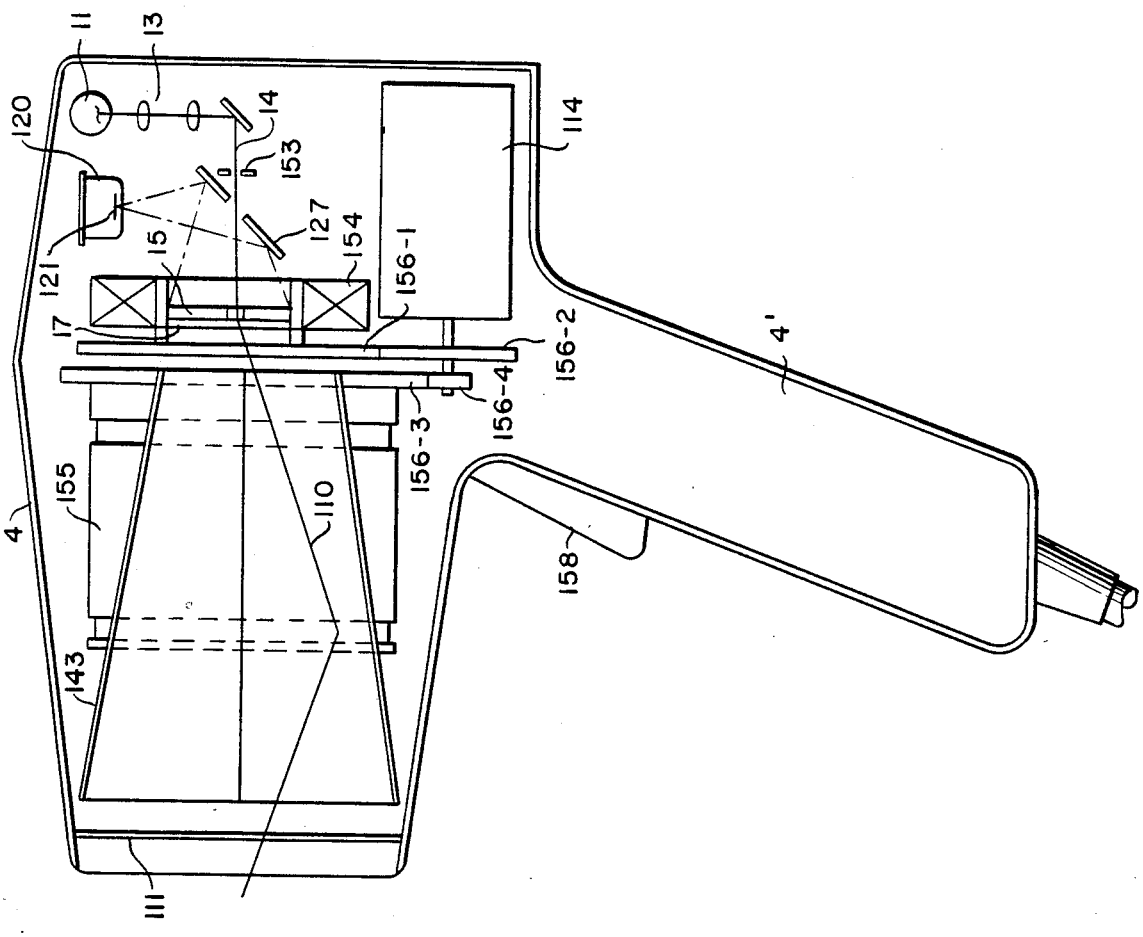

FIG. 26 illustrates a practical example of a device employing the embodiment of the invention shown in FIG. 15 wherein FIG. 26(a) is a side view of the device and FIG. 26(b) is a front view thereof. The optical system is compactly housed within the case 4 and, thus, an operator can perform an information readout operation by holding the grip portion 4' of the case 4 in his hand. It is, of course, possible to form the case 4 itself in cylindrical configuration as depicted in FIG. 2 and use that cylindrical part as the grip portion.

In the case of the device of the present invention shown in FIG. 26, a switch 158 is provided at the grip portion 4' for regulating and generating the laser beam only when the normal readout operation is required to be performed.

In FIG. 26, reference numeral 153 identifies the bored mask for limiting the diameter of laser beam 14; 154 is the support structure for rotating the hologam 17; 155 is the support structure for rotating the mirror tunnel 143; 156-1 is the gear for transmitting rotation of the motor 114 to the hologram 17 via gear 156-2 directly connected to the motor; and 156-3 is the gear for transmitting rotation of motor 114 to the mirror tunnel 143 via gear 156-4 directly connected to the motor.

FIG. 27 shows an example of the optical system which generates the pattern 161 for deflecting and scanning at least two areas for the bar-code-symbols developed in the two directions by using a drum-type hologram scanner 160.

In the above embodiments, the coherent beam is used as the laser beam source, but a similar structure can be formed by using also an incoherent beam, namely, a light emitting diode, CRT, fluorescent lamp or tungsten lamp, etc.

In all of the embodiments of the present invention explained above, there is provided according to the present invention an information readout device having a simple low-cost compact structure having very high readout efficiency.

We claim:

1. A hand held information readout device for reading a bar-code symbol on an object, comprising:
   a laser beam generator;
   an optical scanner comprising a disk hologram which deflects and substantially scans the beam generated from said laser beam generator in at least two different directions for the bar-code symbol to be read and which receives and guides a scattered beam reflected from the bar code symbol;
   a convergent lens for converging the guided scattered beam;
   an optical detector which detects the beam reflected from the bar-code symbol, guided by said disk hologram and converged by said convergent lens; and
   a case accommodating said laser beam generator, said optical scanner and said optical detector having a grip portion for holding the device by the operator and including a rotation drive source located at one end of said case for rotating said disk hologram, located at the other end of said case, about a rotation axis; said laser beam generator being positioned adjacent the rotation axis to project the beam substantially parallel to the rotation axis and said detector being substantially aligned with and positioned adjacent to the rotation axis to detect the converged guided reflected beam.

2. A hand held bar code scanner, comprising:
   a laser beam generator;
   a disk hologram for deflecting and scanning the laser beam from said laser beam generator in at least one circular pattern and for focusing a scattered beam reflected from the bar code;
   a convergent lens for converging the focused scattered beam;
   a detector for detecting the converged focused scattered beam reflected from the bar code; and
   a hand held case for enclosing said laser beam generator, said disk hologram, said convergent lens and said detector and including a rotation drive source located at one end of said case for rotating said disk hologram, located at the other end of said case, about a rotation axis; said laser beam generator being positioned adjacent the rotation axis to project the beam substantially parallel to the rotation axis and said detector being substantially aligned with and positioned adjacent to the rotation axis to detect the converged guided reflected beam.

3. A scanner in accordance with claim 2, wherein said convergent lens is a stationary Fresnel lens having a hole through which the laser beam from said laser beam generator passes.

* * * * *